United States Patent
Ai et al.

(10) Patent No.: US 12,535,057 B2
(45) Date of Patent: Jan. 27, 2026

(54) GEAR SHIFTING DEVICE, TRANSMISSION MECHANISM, AND WIND TURBINE GENERATOR SYSTEM

(71) Applicant: BEIJING GOLDWIND SCIENCE & CREATION WINDPOWER EQUIPMENT CO., LTD., Beijing (CN)

(72) Inventors: Xiaolan Ai, Beijing (CN); Yuliang Yang, Beijing (CN); Si Gao, Beijing (CN); Honglei Xu, Beijing (CN); Xinliang Song, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/960,531

(22) PCT Filed: Sep. 29, 2022

(86) PCT No.: PCT/CN2022/122581
§ 371 (c)(1),
(2) Date: Nov. 26, 2024

(87) PCT Pub. No.: WO2023/226266
PCT Pub. Date: Nov. 30, 2023

(65) Prior Publication Data
US 2025/0237193 A1    Jul. 24, 2025

(30) Foreign Application Priority Data
May 26, 2022 (CN) .......................... 202210583186.2

(51) Int. Cl.
*F16H 1/28*    (2006.01)
*F03D 15/10*   (2016.01)
(Continued)

(52) U.S. Cl.
CPC ......... *F03D 15/101* (2023.08); *F16H 1/2836* (2013.01); *F16H 1/46* (2013.01);
(Continued)

(58) Field of Classification Search
CPC ......... F03D 15/101; F05B 2260/40311; F16H 1/2836; F16H 1/46; F16H 57/021;
(Continued)

(56) References Cited

U.S. PATENT DOCUMENTS 8,747,277 B2    6/2014  Ai et al.
2005/0130792 A1 6/2005  Drago et al.
(Continued)

FOREIGN PATENT DOCUMENTS

CN    101338812 A    1/2009
CN    102753858 A    10/2012
(Continued)

OTHER PUBLICATIONS

European Search Report dated Jul. 17, 2025 Appln. No. 22943454.3.
(Continued)

*Primary Examiner* — Nathaniel E Wiehe
*Assistant Examiner* — Theodore C Ribadeneyra (57) ABSTRACT

A gear shifting device includes a first planetary gear train. The first planetary gear train includes a first ring gear, a first planet carrier, a first planet gear, a sun idler, and a planet idler; the planet idler and the first planet gear are both installed on the first planet carrier; the first planet gear includes a pinion and a bull gear coaxially connected to the pinion; the planet idler and the pinion are both meshed with the inside of the first ring gear and are both meshed with the outside of the sun idler; the pinion can float in the radial (Continued)

direction relative to the first planet carrier; an input shaft is further provided; one end of the input shaft is connected to the first ring gear.

20 Claims, 7 Drawing Sheets

(51) Int. Cl.
*F16H 1/46* (2006.01)
*F16H 57/021* (2012.01)
*F16H 57/08* (2006.01)
*F16H 57/02* (2012.01)

(52) U.S. Cl.
CPC ......... *F16H 57/021* (2013.01); *F16H 57/082* (2013.01); *F05B 2260/40311* (2013.01); *F16H 2057/02078* (2013.01); *F16H 2057/085* (2013.01)

(58) Field of Classification Search
CPC ......... F16H 57/082; F16H 2057/02078; F16H 2057/085

See application file for complete search history.

(56) References Cited

U.S. PATENT DOCUMENTS

| | | | |
|---|---|---|---|
| 2008/0236328 A1 | 10/2008 | Ai et al. | |
| 2012/0309583 A1* | 12/2012 | Ai | F16H 1/28 475/331 |
| 2013/0005528 A1 | 1/2013 | Ai et al. | |
| 2019/0136945 A1* | 5/2019 | Nies | F16H 1/2836 |

FOREIGN PATENT DOCUMENTS

| | | | | |
|---|---|---|---|---|
| CN | 102817967 A | | 12/2012 | |
| CN | 102844586 A | | 12/2012 | |
| CN | 110094464 A | * | 8/2019 | ........... F16H 1/2809 |
| CN | 110939694 A | | 3/2020 | |
| CN | 210830333 U | | 6/2020 | |
| CN | 113280083 A | | 8/2021 | |
| CN | 114645925 A | | 6/2022 | |
| CN | 114922941 A | | 8/2022 | |
| JP | H05180276 A | | 7/1993 | |
| JP | 2010196772 A | | 9/2010 | |
| WO | 2022/022919 A1 | | 2/2022 | |

OTHER PUBLICATIONS

The International Search Report mailed Feb. 9, 2023; PCT/CN2022/122581.
The First Chinese Office Action dated Aug. 23, 2024; Appln. No. 202210583186.2.

* cited by examiner

GEAR SHIFTING DEVICE, TRANSMISSION MECHANISM, AND WIND TURBINE GENERATOR SYSTEM

This application is a National Stage of International Application No. PCT/CN2022/122581, filed 29 Sep. 2022, which claims priority to and the benefit of Chinese patent application No. 202210583186.2, filed May 26, 2022, the entireties of which are hereby incorporated herein by reference.

FIELD

The present application relates to a gear box, which is applicable to a transmission mechanism of a wind turbine generator system. The gearbox is used for increasing the rotating speed of a blade hub to a rotating speed suitable for the operation of the wind turbine generator system, and can also be widely used in other industrial equipment.

BACKGROUND

A conventional wind turbine generator system uses a gear box to convert a low-speed but high-torque power in the main shaft into a high-speed and low-torque power that is conducive to the power generation of the generator.

The planetary gear train of the gearbox of the conventional wind turbine generator system is simple, and is composed of a sun gear, a planet carrier, a planetary gear and a ring gear. The engagement force on each gear tooth is large in the transmission process of such planetary gear train, so the torque load capacity of the entire planetary gear train is limited and cannot meet the requirements of high torque load capacity.

Increasing the number of planetary gears can improve the torque load capacity. However, this may reduce the transmission ratio, and cannot meet the requirement of large transmission ratio of the wind turbine generator system.

Therefore, the method of improving the torque load capacity simply via increasing the number of planetary gears cannot meet the requirements of small volume and large transmission ratio and is not ideal.

SUMMARY

A gearbox is provided according to the present application. The gearbox includes a first planetary-gear-train support sleeve. The first planetary-gear-train support sleeve includes a first ring gear, a first planet carrier, a first planetary gear, a sun idle gear and a planetary idle gear. The planetary idle gear and the first planetary gear are both mounted to the first planet carrier. The first planetary gear includes a pinion. The planetary idle gear and the pinion are both internally engaged with the first ring gear and both externally engaged with the sun idle gear. The pinion is radially floatable relative to the first planet carrier. The gearbox is further provided with an input shaft, and one end of the input shaft is connected to the first ring gear or the sun idle gear.

In a specific embodiment, the planetary idle gear is not radially floatable relative to the first planet carrier, or the planetary idle gear is radially floatable relative to the first planet carrier and the maximum radial floating magnitude of the planetary idle gear is not greater than the maximum radial floating magnitude of the first planet gear.

In a specific embodiment, the first planetary-gear-train support sleeve further includes a first sun gear. The first planetary gear further includes a bull gear and a connection shaft. The diameter or number of teeth of the bull gear is greater than the diameter or number of teeth of the pinion. The bull gear and the pinion are staggered in an axial direction and are axially connected via the connection shaft. The bull gear is externally engaged with the first sun gear.

In a specific embodiment, multiple first planetary gears is provided, and the bull gears of at least two first planetary gears are staggered in the axial direction and projections thereof partially overlap in a plane perpendicular to the axial direction.

In a specific embodiment, a first bearing is provided between the first planetary gear and the first planet carrier, the first bearing is a self-aligning bearing, and the radial floating of the pinion is achieved by using the self-aligning bearing; and/or, the connection shaft includes a first shaft section connected to the pinion and a second shaft section connected to the bull gear, the first shaft section is connected with the second shaft section via a coupling movable in a radial direction so as to achieve the radial floating of the pinion; and/or, the connection shaft is a flexible shaft which is radially deformable, so as to achieve the radial floating of the pinion.

In a specific embodiment, the first bearing is arranged at an end close to the bull gear.

In a specific embodiment, the first planet carrier includes a base and a bottom plate located at one end of the base. The bottom plate and the base are connected or integrated with each other. The base is provided with a base plate. The base plate and the bottom plate opposite to each other and form a first receiving space therebetween for receiving the bull gear. The first bearing is provided between the bull gear and the base plate and/or the bottom plate.

In a specific embodiment, multiple first planetary gears is provided, and the bull gears of at least two first planetary gears are staggered in the axial direction and projections thereof partially overlap in a plane perpendicular to the axial direction; and, a partition plate is provided in the first receiving space to partition the first receiving space into two mounting spaces distributed along the axial direction, and the bull gear with a longer connection shaft and the bull gear with a shorter connection shaft are respectively located in the two mounting spaces.

In a specific embodiment, a through hole is provided in the middle of the base plate. The through hole extends away from the first receiving space to form a first cylinder portion. An end portion of the first cylinder portion is provided with an annular end cover plate extending radially. A second receiving space is formed between the end cover plate and the base plate for receiving the planetary idle gear, the pinion, the first ring gear, and the sun idle gear.

In a specific embodiment, the planetary idle gear is mounted on a planetary idle gear shaft and a second bearing is provided between the planetary idle gear and the planetary idle gear shaft. One end of the planetary idle gear shaft (108) is connected to the end cover plate and the other end thereof is connected to the base plate. One end of the connection shaft of the first planetary gear extends into the second receiving space, and the pinion is sleeved on this end of the connection shaft.

In a specific embodiment, a second cylinder portion extending toward the first receiving chamber is provided in the middle of the input shaft, and the second cylinder portion is inserted into the first cylinder portion.

In a specific embodiment, a top plate is further included, the base plate is provided a sleeve structure extending toward the input shaft, one end of the top plate is connected or integrated with the sleeve structure, and the input shaft is inserted through the top plate and into the first planet carrier to be connected with the first ring gear.

In a specific embodiment, the number of the planetary idle gears is the same as the number of the first planetary gears, and the planetary idle gears and the first planetary gears are alternately arranged at equal spacings along the circumference of the first ring gear.

In a specific embodiment, the gearbox further includes one or more stages of second planetary gear train. The second planetary gear train includes a second ring gear, a second planet carrier, a second planetary gear and a second sun gear. The second planetary gear is mounted to the second planet carrier. The second planetary gear is internally engaged with the second ring gear and externally engaged with the second sun gear. The second planet carrier is in transmission connection with the first sun gear or the second sun gear of the previous stage.

In a specific embodiment, the second planet carrier includes two mounting plates spaced apart along the axial direction, and a receiving space for receiving the second planetary gear is formed between the two mounting plates. The second planetary gear is mounted on a second planetary gear shaft. A third bearing is provided between the second planetary gear and the second planetary gear shaft. Two ends of the second planetary gear shaft are respectively connected to the two mounting plates.

In a specific embodiment, the second planet carrier includes a connection sleeve, one end of the connection sleeve is integrated or connected with one of the mounting plates, and the other end thereof extends toward the first sun gear or the second sun gear of the previous stage. The first sun gear or the second sun gear of the previous stage is connected to the connection sleeve.

A transmission mechanism is further provided according to the present application. The transmission mechanism includes the gearbox according to any one of the above aspects.

A wind turbine generator system is further provided according to the present application. The wind turbine generator system includes a blade hub and the transmission mechanism as described above. The gearbox of the transmission mechanism is connected to the blade hub to increase the rotating speed of the blade hub to a target rotating speed.

The planetary idle gear and the pinion of the gearbox according to the present application can share the torque together, thereby improving the torque load capacity of the entire first planetary gear train.

Moreover, since the torque load on the pinion is reduced, the requirement of load bearing can be met even with a pinion of a smaller size. Therefore, more pinions can be arranged in a same volume, thereby further improving the torque load capacity of the entire first planetary gear train by increasing the number of pinions while ensuring a small volume. Therefore, the gearbox disclosed herein has a high torque load density.

In an embodiment of the gearbox described above, the bull gears of at least two first planetary gears are staggered in the axial direction and projections thereof partially overlap in a plane perpendicular to the axial direction, so that the gearbox can have a small volume and a large transmission ratio at the same time.

The transmission mechanism and the wind turbine generator system according to the present application also have the above technical effect because they include said gearbox.

BRIEF DESCRIPTION OF THE DRAWINGS

FIG. 7 illustrates the transmission path in the section A-B of FIG. 5, and FIG. 8 illustrates the transmission path in the section B-B of FIG. 5.

Reference marks in FIG. 1 to FIG. 7 are listed as follows:
100 first planetary gear train;
101 first ring gear;
102 first planet carrier; 1021 base, 1021a base plate; 1021b first cylinder portion; 1021c support sleeve; 1021d end cover plate; 1021e sleeve structure; 1022 bottom plate; 1023 top plate; A bearing connecting portion;
103 first planetary gear; 103a pinion; 103b bull gear; 103c connection shaft;
104 sun idle gear; 105 planetary idle gear; 106 first sun gear; 107 first bearing; 108 planetary idle gear shaft; 109 second bearing; 110 input shaft; 111 second cylinder portion; 112 connection tray;
200 second planetary gear train;
201 second ring gear;
202 second planet carrier, 202a mounting plate, 202b connection arm, 202c connection sleeve;
203 second planetary gear; 204 second planetary gear shaft; 205 fifth bearing;
206 second sun gear;
207 output shaft;
208 end cap; 2081 flange connecting plate;
111 third bearing; 112 fourth bearing;
209 seventh bearing; 210 sixth bearing.

DETAILED DESCRIPTION OF THE EMBODIMENTS

In order to enable those skilled in the art to better understand the technical solutions of the present application, the technical solutions of the present application is further described in detail below with reference to the accompanying drawings and specific embodiments.

Figure 1:
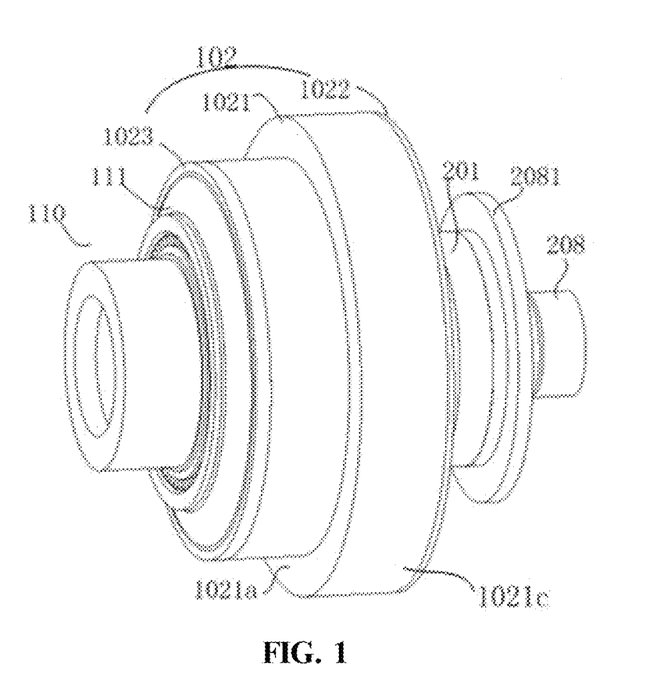
FIG. 1 is a schematic view of a gearbox according to an embodiment of the present application.
Figure 2:
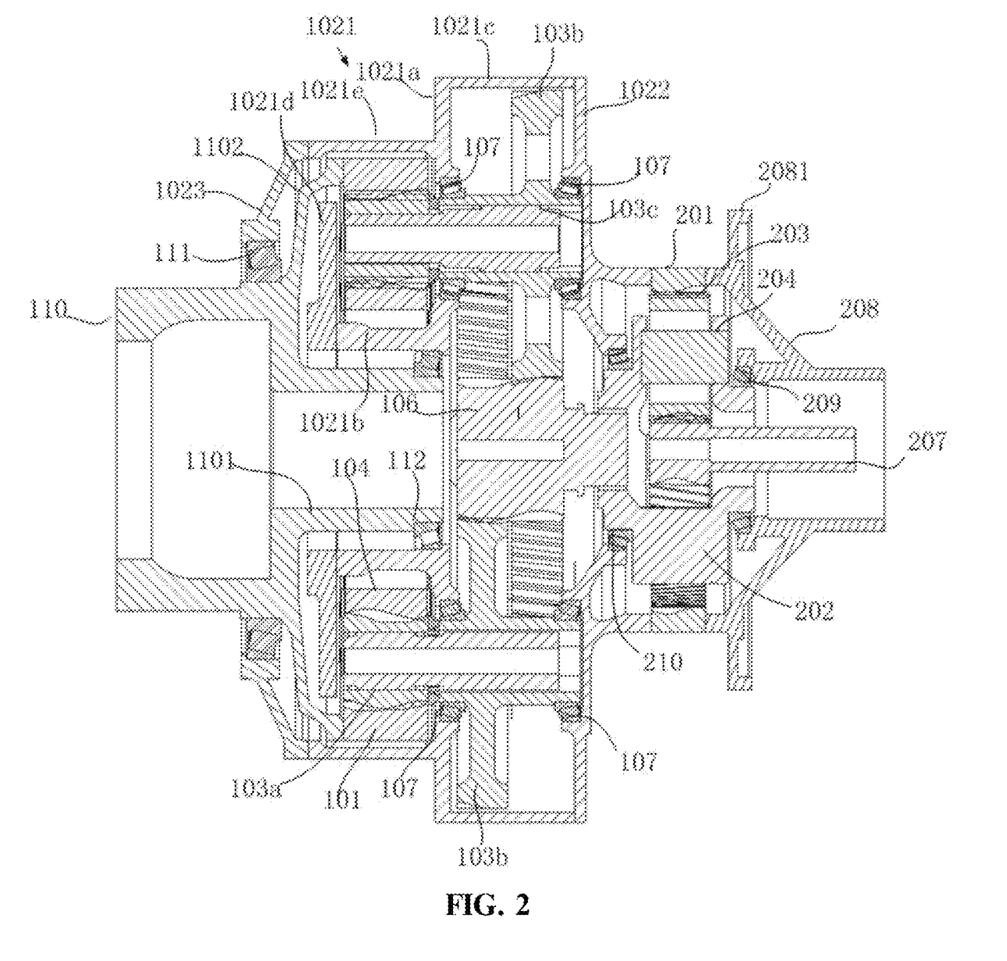
FIG. 2 is a schematic view of an axial section of the gearbox in FIG. 1.

As shown in FIGS. 1 and 2, the gearbox includes a first planetary gear train 100.

The first planetary gear train 100 includes a first ring gear 101, a first planet carrier 102, a first planetary gear 103, a sun idle gear 104 and a planetary idle gear 105.

The first planetary gear 103 includes a pinion 103a mounted between the first ring gear 101 and the sun idle gear 104. The pinion 103a is internally engaged with the first ring gear 101 and externally engaged with the sun idle gear 104.

The planetary idle gear 105 is also mounted between the first ring gear 101 and the sun idle gear 104. The planetary idle gear 105 is internally engaged with the first ring gear 101 and externally engaged with the sun idle gear 104. The planetary idle gear 105 has direct torque transmission only with the first ring gear 101 and the sun idle gear 104. The sun idle gear 104 has direct torque transmission only with the planetary idle gear 105 and the pinion 103a.

The first planetary gear 103 and the planetary idle gear 105 are both supported and mounted on the first planet carrier 102. After installation, the pinion 103a of the first planetary gear 103 is radially (radial direction of the pinion 103a) floatable relative to the first planet carrier 102 along a revolution direction. However, the planetary idle gear 105 is not radially (radial direction of the planetary idle gear 105) floatable relative to the first planet carrier 102, or the planetary idle gear 105 is radially floatable relative to the first planet carrier 102 along the revolution direction but the maximum radial float magnitude of the planetary idle gear is not greater than the maximum radial float magnitude of the first planet gear 103.

As shown in FIG. 2, the first planetary gear train 100 in the present embodiment is further provided with an input shaft. One end of the input shaft 110 is coaxially connected with the first ring gear 101. Power is input from the input shaft 110 to drive the first ring gear 101 to rotate, and then to drive the first planetary gear 103 and the planetary idle gear 105 to rotate.

Due to the above floating design, when the first ring gear 101 rotates axially under the input torque, at least part of the torque is transmitted to the planetary idle gear 105, and then transmitted to the sun idle gear 104 via the planetary idle gear 105. The sun idle gear 104 and the first ring gear 101 jointly drive the pinion 103a of the first planetary gear 103, so that the planetary idle gear 105 and the pinion 103a share the torque load of the ring gear together. Therefore, the torque load on the pinion 103a can be reduced, and the torque load capacity of the entire first planetary gear train 100 can be improved.

Moreover, since the torque load on the pinion 103a is reduced, the requirement of load bearing can be met even with a pinion 103a of a smaller size. Therefore, more pinions 103a can be arranged in a same volume, thereby further improving the torque load capacity of the entire first planetary gear train 100 while ensuring a small volume through increasing the number of pinions 103a. Therefore, a high torque load density can be achieved.

Further, the first planetary gear train 100 further includes a first sun gear 106. The first planetary gear 103 further includes a bull gear 103b and a connection shaft 103c. The diameter or number of teeth of the bull gear 103b is greater than the diameter or number of teeth of the pinion 103a. The bull gear 103b and the pinion 103a are staggered in an axial direction and are in coaxial transmission connection with each other via the connection shaft 103c.

The bull gear 103b of the first planetary gear 103 is externally engaged with the first sun gear 106, so that the torque can be further transmitted to the first sun gear 106 for torque output. Since the diameter of the bull gear 103b is greater than the diameter of the pinion 103a, the first planetary gear train 100 can obtain a large transmission ratio through the bull gear 103b engaging with the first sun gear 106 for torque output.

In a case that multiple (two or more) first planetary gears 103 are provided, the bull gears 103b of at least two first planetary gears 103 are staggered in the axial direction and projections thereof partially overlap in a plane perpendicular to the axial direction, as shown in FIG. 2. In the sectional view in FIG. 2, since the bull gears 103c are staggered in the axial direction, the distances between each staggered bull gear 103b and pinion 103a are different in a direction away from the input shaft 110. The bull gear 103b located on the upper side of FIG. 2 may be defined as long shaft gear, and the bull gear 103b located on the lower side of FIG. 2 may be defined as short shaft gear. Specifically, the bull gears 103b of two first planetary gears 103 may be staggered from each other in the axial direction by allowing the connection shafts 103c of two first planetary gears 103 to have different lengths. The bull gears 103b are staggered in the axial direction, so that larger bull gears 103b can be arranged under same volume, which is helpful for the first planetary gear train 100 to obtain a larger transmission ratio.

According to the present application, the differential floating design as described above is adopted, and the bull gears 103b of at least two first planetary gears 103 are staggered in the axial direction and projections thereof partially overlap in a plane perpendicular to the axial direction, so that the first planetary gear train 100 has a high torque load capacity, a large transmission ratio and a small volume, which solves the problem that the conventional gearbox cannot meet the requirements on the three parameters at the same time.

Specifically, as shown in FIG. 2, a first bearing 107 is provided between the first planetary gear 103 and the first planet carrier 102, so that the first planetary gear 103 is rotatable about its own axis relative to the first planet carrier 102 when rotating.

Specifically, there are various configurations allowing the pinion 103a of the first planetary gear 103 to float radially relative to the first planet carrier 102.

For example, as shown in FIG. 2, the first bearing 107 is a self-aligning bearing, and the radial floating of the pinion 103a is achieved by variation of the self-aligning angle of the self-aligning bearing, and the maximum radial floating magnitude is associated with the magnitude of the self-aligning angle.

In the present embodiment, the self-aligning bearing is preferably arranged at an end close to the bull gear 103b or at an end away from the pinion 103a, which can always ensure good engagement of the pinion 103a with the sun idle gear 104 and the first ring gear 101 during the floating of the pinion 103a.

As shown in FIG. 2, the hole wall of the gear hole of the bull gear 103b extends towards two sides on the axial direction to form extension sections. One first bearing 107 is arranged between, the extension section of each of the two sides, and the first planet carrier 102. Provision of two first bearings 107 allows the load bearing to be relatively reliable and stable. In this case, a self-aligning shaft 103c is used to connect the bull gear 103b with the pinion 103.

For another example, one configuration to achieve float is as follows. The connection shaft 103c is arranged in sections, and the connection shaft 103c includes a first shaft section connected to the pinion 103a and a second shaft section connected to the bull gear 103b, and the first shaft section is connected with the second shaft section via a coupling movable in a radial direction.

For another example, one configuration to achieve float is as follows. The connection shaft is a flexible shaft which is radially deformable.

For another example, a combination of any two or more of the above configurations may be used.

Figure 4:
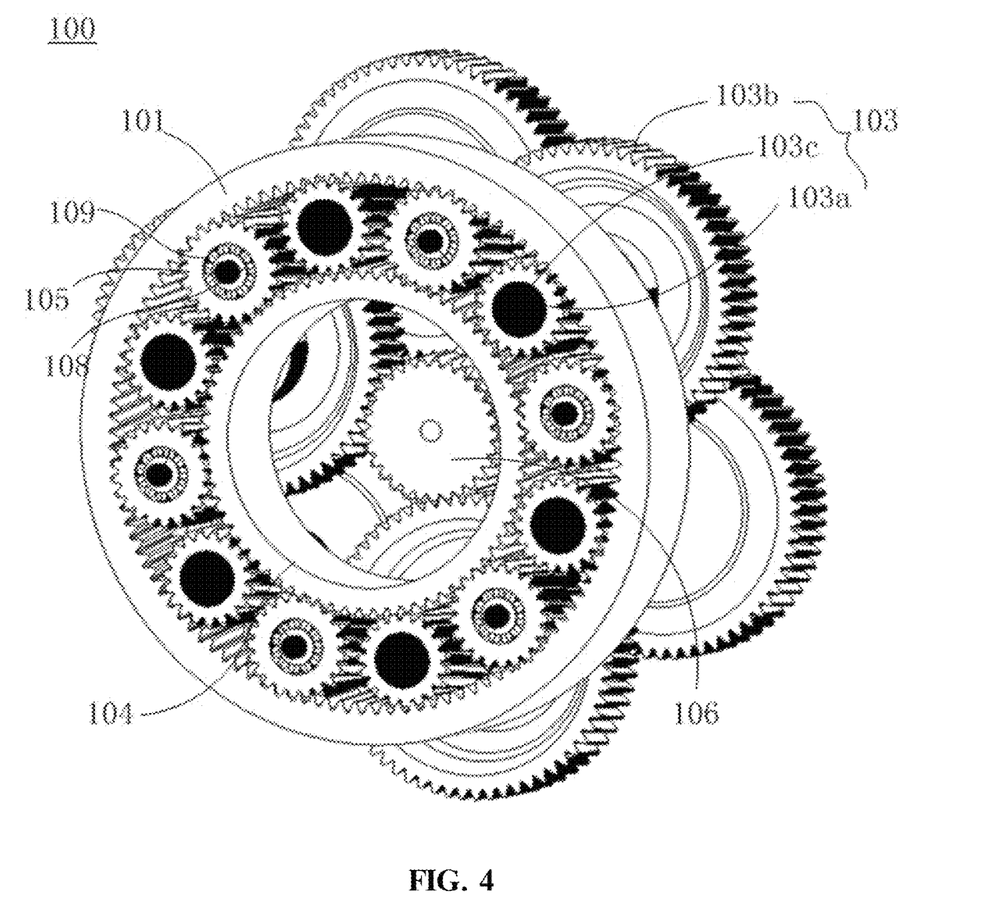
FIG. 4 is a schematic view of a first planetary gear train in the gearbox in FIG. 1, not showing a first planet carrier.
Figure 5:
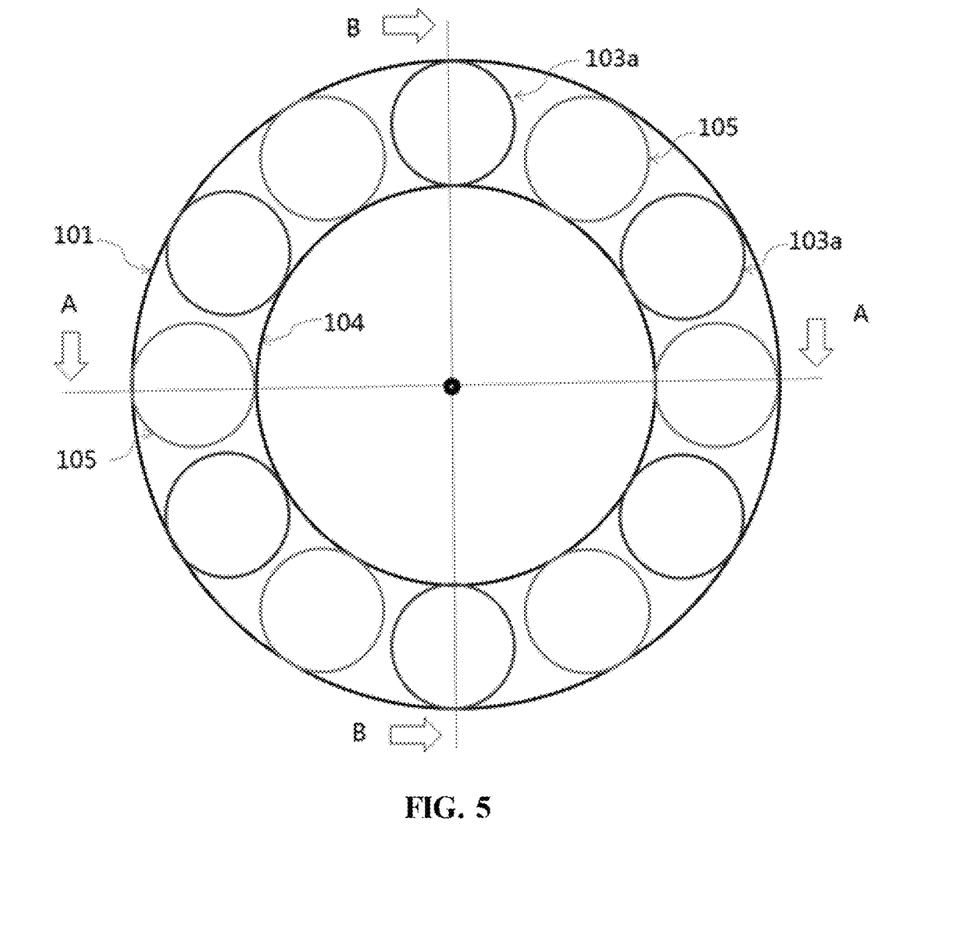
FIG. 5 is a schematic view of an end portion of the first planetary gear train in FIG. 4, mainly showing a first ring gear, a first planetary gear, a planetary idle gear and a sun idle gear.
Figure 6:
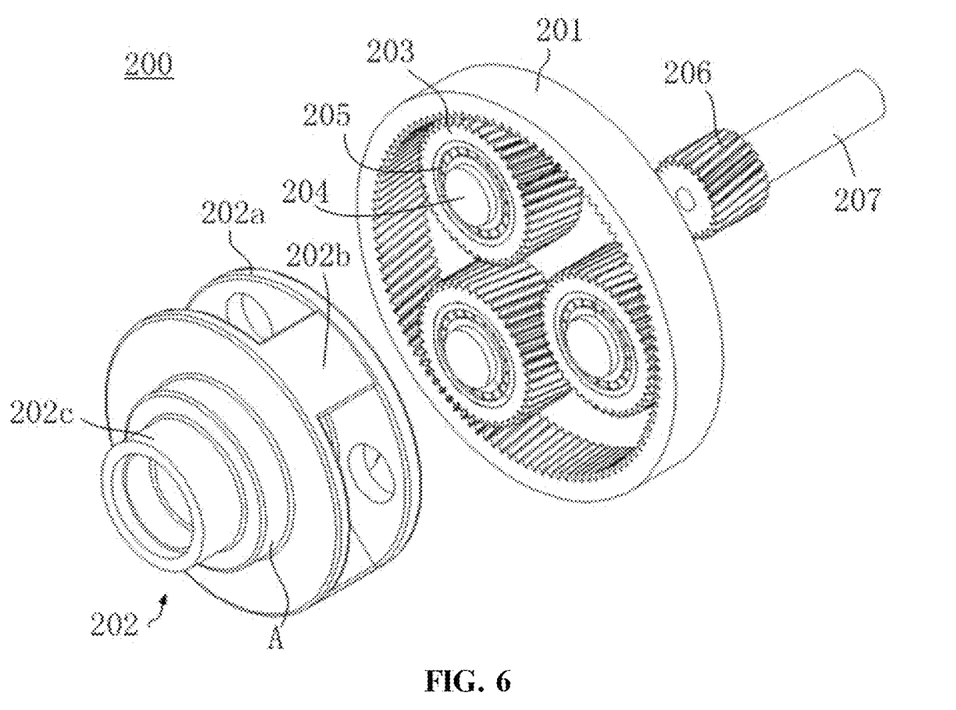
FIG. 6 is an exploded view of a second planetary gear train in FIG. 1.

Specifically, as shown in FIGS. 4 and 6, the number of the planetary idle gears 105 may be the same as the number of the first planetary gears 103, and the planetary idle gear 105 and the first planetary gear 103 are alternately arranged at equal or unequal spacings along the circumference of the first ring gear 101. In this way, the overall stress of the first planetary gear train 100 is relatively balanced, the transmission is relatively stable, and the service life is relatively long. In FIG. 6, two pinions 103a adjacent to the planetary idle gear 104 are connected to the short shaft bull gear 103b and the long shaft bull gear 103b respectively, so that the torque transmission is relatively uniform.

Figure 3:
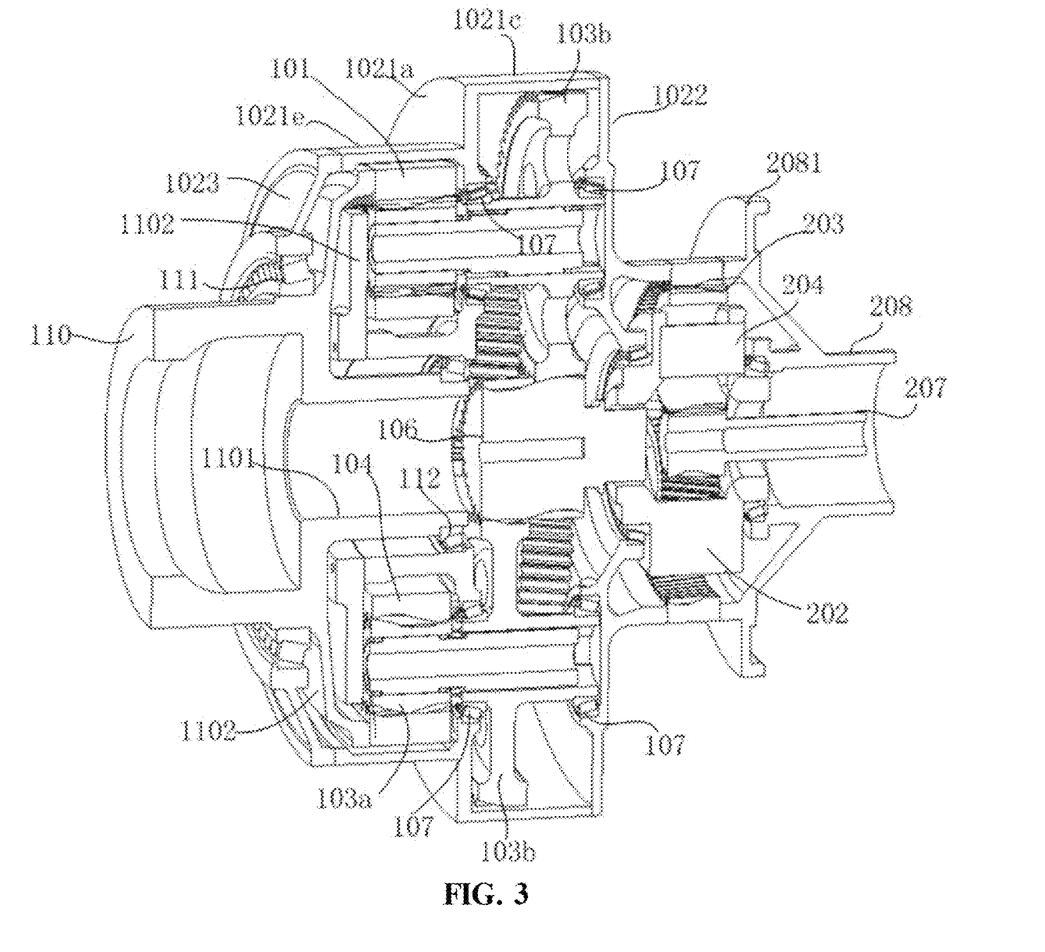
FIG. 3 is a perspective view of the axial section of the gearbox in FIG. 1.

Specifically, as shown in FIGS. 2 and 3, the first planet carrier 102 includes a base 1021 and a bottom plate 1022. The base 1021 is provided with a base plate 1021a and an annular support sleeve 1021c. One end of the support sleeve 1021c is connected to the base plate 1021a, and the other end thereof is connected to the bottom plate 1022.

A first receiving space for receiving the bull gear 103b is formed between the base plate 1021a and the bottom plate 1022. The base plate 1021a and the bottom plate 1022 are each provided with a bearing seat hole or a bearing seat groove for mounting the first bearing 107.

As shown in FIGS. 2 and 3, two ends of the bull gear 103b of the first planetary gear 103 are respectively supported on and connected to the base plate 1021a and the bottom plate 1022 via the first bearing 107. The bull gear 103b may be supported by only one first bearing 107 which can be entirely arranged on the base plate 1021a or the bottom plate 1022. Alternatively, the bull gear 103b with the relatively long connection shaft 103c is supported on and connected to the bottom plate 1022 via the first bearing 107, and the bull gear 103b with the relatively short connection shaft 103c is supported on and connected to the base plate 1021a via the first bearing 107, so as to meet the installation requirement that the bull gears 103b of at least two first planetary gears 103 are staggered in the axial direction, and meet the requirement that the first bearing 107 is mounted close to the bull gear 103b.

A partition plate is provided in the first receiving space to partition the first receiving space into two mounting spaces along the axial direction. The bull gear 103 with the relatively long connection shaft 103c is located in the mounting space near the bottom plate 1022, and the bull gear 103 with the relatively short connection shaft 103c is located in the mounting space near the base plate 1021a, so as to well support the axially staggered bull gears 103b. In this case, the bull gear 103b with the relatively long connection shaft 103c is supported between the partition plate and the bottom plate 1022 via two first bearings 107, and the bull gear 103b with the relatively short connection shaft 103c is supported between the partition plate and the base plate 1021a via two first bearings 107.

As shown in FIGS. 2 and 3, a through hole is provided in the middle of the base plate 1021a. The through hole extends away from the first receiving space to form a first cylinder portion 1021b. An end portion of the first cylinder portion 1021b is provided with an annular end cover plate 1021d which extends radially. A second receiving space is formed between the end cover plate 1021d and the base plate 1021a for receiving the planetary idle gear 105, the pinion 103a, the first ring gear 101, and the sun idle gear 104. The first planet carrier 101 further includes a top plate 1023. The base plate 1021a extends towards the input shaft 110 to form a sleeve structure 1021e. The sleeve structure 1021e is connected to the top plate 1023.

As shown in FIGS. 2 and 3, one end of the connection shaft 103c of the first planetary gear 103 extends into the second receiving space, and the pinion 103a is mounted on this end of the connection shaft 103c. Such arrangement can meet the installation requirements of the planetary idle gear 105 and the pinion 103a.

The planetary idle gear 105 is mounted on a planetary idle gear shaft 108, and a second bearing 109 is provided between the planetary idle gear 105 and the planetary idle gear shaft 108. One end of the planetary idle gear shaft 108 is connected to the end cover plate 1021d, and the other end thereof is connected to the base plate 1021a.

Specifically, as shown in FIG. 2, one end of the input shaft 110 is inserted into the top plate 1023, and the other end thereof extends axially away from the top plate 1023 to be externally connected to a drive device to input the torque. One end of the input shaft 110 is inserted into the interior of the first planet carrier 102, and a third bearing 111 is provided between the top plate 1023 of the first planet carrier 102 and the input shaft 110. The end of the input shaft 110 inserted into the interior of the first planet carrier 102 is provided with a connection tray 1102. The connection tray 1102 is connected with the first ring gear 101, and the middle of the end is further provided with an extended second sleeve 1101. The second sleeve 1101 is inserted into the first cylinder portion 1021b of the first planet carrier 102. Such insertion installation is reliable. Moreover, for ease of rotation, a fourth bearing 112 is further provided between the first cylinder portion 1021b and the second cylinder portion 1101.

The first planet carrier 102 of the above structure can meet the requirements of assembling with the first planetary gear 103, the planetary idle gear 105, and the first ring gear 101, and has a small volume and a high degree of integration. The structure of the first planet carrier 102 can be flexibly configured according to the actual needs rather than limited to the above structure, as long as it can meet the requirements of assembling with the first planetary gear 103, the planetary idle gear 105, and the first ring gear 101.

The outer periphery of the first planet carrier 102 may be provided with torsion arms (not shown) for balancing. Each torsion arm may be an arm structure extending radially from the outer periphery of the first planet carrier 102. Two torsion arms are symmetrically arranged along the axis.

Further, as shown in FIGS. 2 and 3, the gearbox may further be provided with a second planetary gear train 200. The second planetary gear train 200 includes a second ring gear 201, a second planet carrier 202, a second planetary gear 203, and a second sun gear 206.

The second planetary gear 203 is mounted to the second planet carrier 202. The second planetary gear 203 is mounted between the second ring gear 201 and the second sun gear 206. The second planetary gear 203 is internally engaged with the second ring gear 201 and externally engaged with the second sun gear 206.

Specifically, only one stage of second planetary gear train 200 may be provided, or multiple stages (two or more stages) of second planetary gear trains 200 may be provided. In a case that multiple stages of second planetary gear trains 200 are provided, the multiple stages of second planetary gear trains 200 are arranged in the axial direction, and the second planet carrier 202 of the second planetary gear train 200 of the next stage is connected with the second sun gear 206 of the second planetary gear train 200 of the previous stage.

Figure 7:
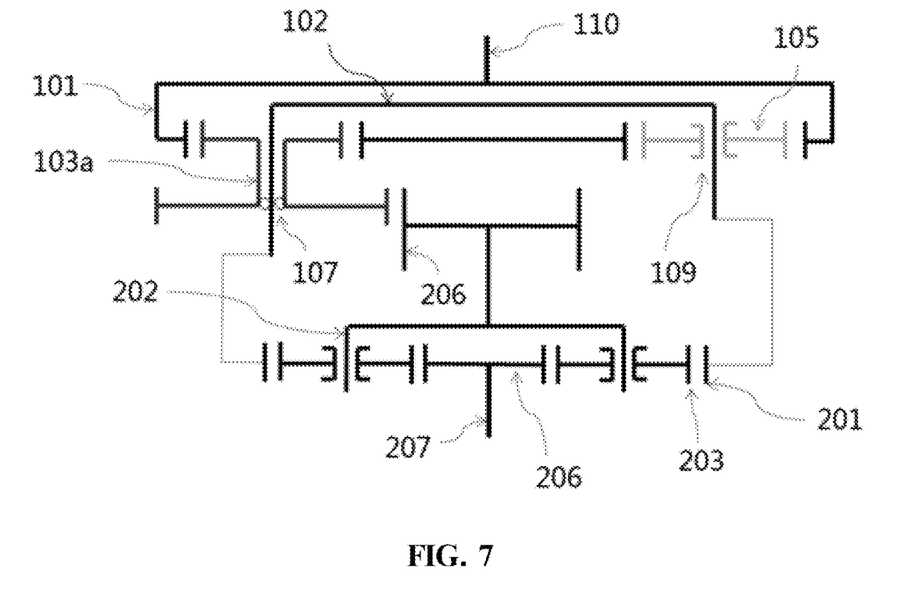
FIGS. 7 and 8 are schematic views of the transmission path of an embodiment of the gearbox according to the present application.

Specifically, as shown in FIG. 7, the second planet carrier 202 includes two mounting plates 202a spaced apart along the axial direction and connection arms 202b connecting the two mounting plates 202a. A receiving space for receiving the second planetary gear 203 is formed between the two mounting plates 202a.

As shown in FIG. 3, the second planetary gear 203 is mounted on a second planetary gear shaft 204. A fifth bearing 205 is provided between the second planetary gear 203 and the second planetary gear shaft 204. Two ends of the second planetary gear shaft 204 are respectively connected to the two mounting plates 202a. Such arrangement can meet the installation requirement of the second planetary gear 203.

Specifically, as shown in FIG. 7, the second planet carrier 202 may further include a connection sleeve 202c. One end of the connection sleeve 202c is connected to or integrated with one mounting plate 202a, and the other end thereof extends towards the first sun gear 106 or the second sun gear 206 of the previous stage. The connection sleeve 202c is configured for connecting with the first sun gear 106 or the second sun gear 206 of the previous stage. The second sun gear 206 of the last stage is connected with an output shaft 207, and the torque is transmitted to an external device via the output shaft 207.

Specifically, as shown in FIG. 7, the second planet carrier 202 is further provided with a bearing connecting portion A. In the illustrated embodiment, one end, where the connection sleeve 202c is located, of the second planetary carrier 202 and one end, where the mounting plate 202a far from the connection sleeve 202c is located, of the second planet carrier 202 are each provided with one bearing connecting portion A (only one is visible in FIG. 7). The second planet carrier 202 is at least partially installed in the bottom plate 1022, and the two bearing connecting portions A at two ends of the second planet carrier 202 are mounted with a sixth bearing 210 and a seventh bearing 209 respectively, so that the second planet carrier 202 is respectively supported on the bottom plate 1022 and an end cap 208 via the sixth bearing 210 and the seventh bearing 209. Two sides of the second ring gear 201 along the axial direction are connected to the bottom plate 1022 and the end cap 208. The first planet carrier 102, the top plate 1023 and the end cap 208 jointly form the housing of the gearbox.

The end cap 208 may further be provided with a flange connecting plate 2081, so that the end cap 208 can be connected and secured to an external device via the flange connecting plate 2081.

The second planet carrier 202 of the above structure can meet the requirement of assembling with the second planetary gear 203, and has a small volume and a high degree of integration. The structure of the second planet carrier 202 can be flexibly configured according to the actual needs rather than limited to the above structure, as long as it can meet the requirement of assembling with the second planetary gear 203.

Figure 8:
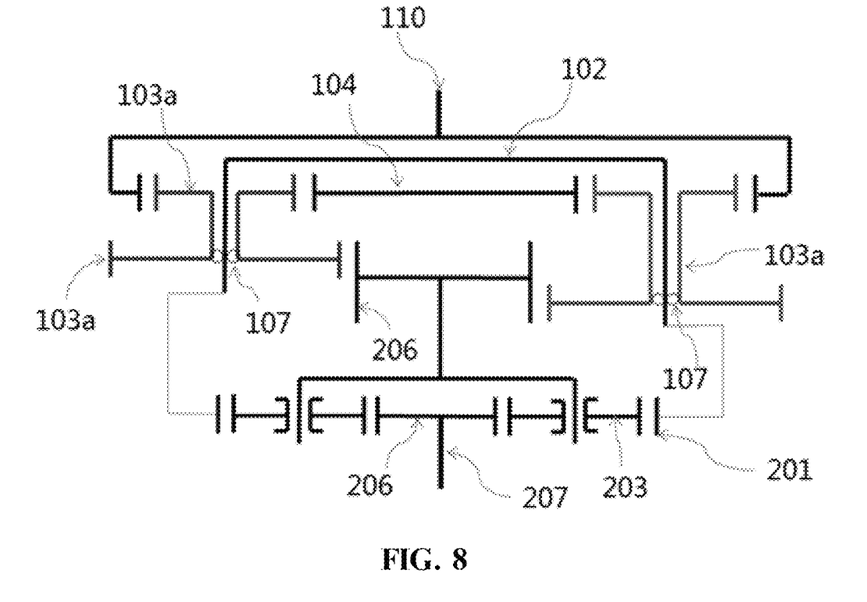

As shown in FIGS. 7 and 8, the transmission path of the gearbox in the present embodiment is as follows.

The input torque acts on the first ring gear 101. Due to the floating design of the first planetary gear 103, the first idle gear 105 is driven to rotate and the sun idle gear 104 is driven to rotate. The sun idle gear 104 and the first ring gear 101 simultaneously drive the first planetary gear 103 to rotate, so that the planetary idle gear 105 and the pinion 103a rotate about their own axes while revolving with the first planet carrier 102. During the process of torque distribution, at least part of the torque is transmitted to the planetary idle gear 105, and is then transmitted to the sun idle gear 104 via the planetary idle gear 105, and is then transmitted to the pinion 103a of the first planetary gear 103 via the sun idle gear 104 and the first ring gear 101. The reliability of the torque input from the first ring gear 101 is high and the engagement load balancing capacity is good.

Each pinion 103a transmits the torque load thereon to the bull gear 103b connected thereto. The bull gears 103b further transmit the torque to the first sun gear 106, and the bull gears 103b jointly drive the first sun gear 106 and the second planet carrier 202 connected thereto to rotate.

The second planet carrier 202 transmits the torque to the second planetary gear 203, the second planetary gear 203 transmits the torque to the second sun gear 206 and the output shaft 207 connected thereto, and the output shaft 207 transmits the torque to an external device.

In the present embodiment, the power is input from the first ring gear 101. It can be understood that the power can also be input from the sun idle gear 104. In the latter case, the input torque acts on the sun idle gear 104. Due to the floating design of the first planetary gear 103, the first idle gear 105 is driven to rotate and then the first ring gear 101 is driven to rotate. The sun idle gear 104 and the first ring gear 101 simultaneously drive the first planetary gear 103 to rotate, so that the planetary idle gear 105 and the pinion 103a rotate around their own axes while revolving with the first planet carrier 102. During the process of torque distribution, at least part of the torque is transmitted to the planetary idle gear 105, and is then transmitted to the first ring gear 101 via the planetary idle gear 105, and is then transmitted to the pinion 103a of the first planetary gear 103 via the sun idle gear 104 and the first ring gear 101.

In conclusion, the core idea of the present application is to reduce the load born by the gear teeth of the first planetary gear 103 by arranging the maximum radial floating of the pinion 103a of the first planetary gear 103 to be not less than (i.e. greater than or equal to) the maximum radial floating of the planetary idle gear 105 (if the planetary idle gear 105 is fixed, the maximum radial floating is zero) and using the planetary idle gear 105 to share the ring gear torque. In this way, the gearbox can have a small volume and a high torque load capacity at the same time, achieving a high torque load density. Further, the bull gears 103b of at least two first planetary gears 103 are staggered in the axial direction and projections thereof partially overlap in a plane perpendicular to the axial direction, so that the gearbox can have a small volume and a large transmission ratio at the same time.

The principle and implementation of the present application have been described above through specific examples. The description of the above embodiments is intended to facilitate understanding the method and core idea of the present application. It should be noted that, for those skilled in the art, some modifications and improvements may be made to the present application without departing from the principle of the present application, and these modifications and improvements should fall within the scope of protection of the appended claims of the present application.

The invention claimed is:

1. A gearbox, comprising a first planetary gear train, wherein the first planetary gear train comprises a first ring gear, a first planet carrier, a plurality of first planetary gears, a sun idle gear and a planetary idle gear; the planetary idle gear and the plurality of first planetary gears are mounted to the first planet carrier; each of the plurality of first planetary gears comprises a pinion and a bull gear; the planetary idle gear and the pinion are both internally engaged with the first ring gear and both externally engaged with the sun idle gear; the pinion is radially floatable relative to the first planet carrier; the gearbox is further provided with an input shaft, and one end of the input shaft is connected to the first ring gear or the sun idle gear, wherein bull gears of at least two first planetary gears are staggered in the axial direction and projections of at least two first planetary gears partially overlap in a plane perpendicular to the axial direction.

2. The gearbox according to claim 1, wherein the planetary idle gear is not radially floatable relative to the first planet carrier, or the planetary idle gear is radially floatable relative to the first planet carrier and a maximum radial floating magnitude of the planetary idle gear is not greater than a maximum radial floating magnitude of the first planetary gear.

3. The gearbox according to claim 2, wherein the first planetary gear train further comprises a first sun gear; the first planetary gear further comprises a connection shaft, the diameter or number of teeth of the bull gear is greater than the diameter or number of teeth of the pinion, the bull gear and the pinion are staggered in an axial direction and are axially connected via the connection shaft; and the bull gear is externally engaged with the first sun gear.

4. The gearbox according to claim 1, wherein a first bearing is provided between the first planetary gear and the first planet carrier, the first bearing is a self-aligning bearing, and radial floating of the pinion is achieved by using the self-aligning bearing; and/or, the connection shaft comprises a first shaft section connected to the pinion and a second shaft section connected to the bull gear, the first shaft section is connected with the second shaft section via a coupling movable in a radial direction so as to achieve the radial floating of the pinion; and/or, the connection shaft is a flexible shaft which is radially deformable, so as to achieve the radial floating of the pinion.

5. The gearbox according to claim 4, wherein the first bearing is arranged at an end close to the bull gear.

6. The gearbox according to claim 1, wherein the number of the planetary idle gear is the same as the number of the first planetary gear, and the planetary idle gear and the first planetary gear are alternately arranged along a circumferential direction of the first ring gear.

7. The gearbox according to claim 1, wherein the first planetary gear train further comprises a first sun gear, wherein the gearbox further comprises one or more stages of second planetary gear train, the second planetary gear train comprises a second ring gear, a second planet carrier, a second planetary gear and a second sun gear, the second planetary gear is mounted to the second planet carrier, and the second planetary gear is internally engaged with the second ring gear and externally engaged with the second sun gear; and the second planet carrier is in transmission connection with the first sun gear or the second sun gear of a previous stage.

8. The gearbox according to claim 7, wherein the planetary idle gear is not radially floatable relative to the first planet carrier, or the planetary idle gear is radially floatable relative to the first planet carrier and a maximum radial floating magnitude of the planetary idle gear is not greater than a maximum radial floating magnitude of the first planetary gear.

9. The gearbox according to claim 7, wherein the first planetary gear further comprises a bull gear and a connection shaft, the diameter or number of teeth of the bull gear is greater than the diameter or number of teeth of the pinion, the bull gear and the pinion are staggered in an axial direction and are axially connected via the connection shaft; and the bull gear is externally engaged with the first sun gear.

10. The gearbox according to claim 7, wherein a first bearing is provided between the first planetary gear and the first planet carrier, the first bearing is a self-aligning bearing, and radial floating of the pinion is achieved by using the self-aligning bearing; and/or, the connection shaft comprises a first shaft section connected to the pinion and a second shaft section connected to the bull gear, the first shaft section is connected with the second shaft section via a coupling movable in a radial direction so as to achieve the radial floating of the pinion; and/or, the connection shaft is a flexible shaft which is radially deformable, so as to achieve the radial floating of the pinion.

11. A transmission mechanism, comprising the gearbox according to claim 1.

12. A wind turbine generator system, comprising a blade hub and the transmission mechanism according to claim 11, wherein the gearbox of the transmission mechanism is connected to the blade hub to increase a rotating speed of the blade hub to a target rotating speed.

13. A gearbox, comprising a first planetary gear train, wherein the first planetary gear train comprises a first ring gear, a first planet carrier, a first planetary gear, a sun idle gear and a planetary idle gear; the planetary idle gear and the first planetary gear both mounted to the first planet carrier; the first planetary gear comprises a pinion and a bull gear; the planetary idle gear and the pinion are both internally engaged with the first ring gear and both externally engaged with the sun idle gear; the pinion is radially floatable relative to the first planet carrier; the gearbox is further provided with an input shaft, and one end of the input shaft is connected to the first ring gear or the sun idle gear, wherein a first bearing is provided between the first planetary gear and the first planet carrier, wherein the first planet carrier comprises a base and a bottom plate located at one end of the base, wherein the bottom plate and the base are connected or integrated with each other, the base is provided with a base plate, the base plate and the bottom plate opposite to each other and form a first receiving space therebetween for receiving the bull gear, and the first bearing is provided between the bull gear and the base plate and/or the bottom plate.

14. The gearbox according to claim 13, wherein a plurality of first planetary gears is provided, wherein bull gears of at least two first planetary gears are staggered in the axial direction and projections of at least two first planetary gears partially overlap in a plane perpendicular to the axial direction; and a partition plate is provided in the first receiving space to partition the first receiving space into two mounting spaces distributed along the axial direction, and the bull gear with a relatively long connection shaft and the bull gear with a relatively short connection shaft are respectively located in the two mounting spaces.

15. The gearbox according to claim 13, wherein a through hole is provided in the middle of the base plate, the through hole extends away from the first receiving space to form a first cylinder portion, an end portion of the first cylinder portion is provided with an annular end cover plate which extends radially, and a second receiving space is formed between the end cover plate and the base plate for receiving the planetary idle gear, the pinion, the first ring gear, and the sun idle gear.

16. The gearbox according to claim 15, wherein the planetary idle gear is mounted on a planetary idle gear shaft, and a second bearing is provided between the planetary idle gear and the planetary idle gear shaft, wherein one end of the planetary idle gear shaft is connected to the end cover plate and the other end thereof is connected to the base plate; and one end of the connection shaft of the first planetary gear, on which the pinion is mounted, extends into the second receiving space.

17. The gearbox according to claim 15, wherein a second cylinder portion extending toward the first receiving chamber is provided in a middle of the input shaft, and the second cylinder portion is inserted into the first cylinder portion.

18. The gearbox according to claim 17, further comprising a top plate, wherein the base plate is provided a sleeve structure extending toward the input shaft, one end of the top plate is connected or integrated with the sleeve structure, and the input shaft is inserted through the top plate and into the first planet carrier to be connected with the first ring gear.

19. A gearbox, comprising a first planetary gear train, wherein the first planetary gear train comprises a first ring gear, a first planet carrier, a first planetary gear, a sun idle gear and a planetary idle gear; the planetary idle gear and the first planetary gear both mounted to the first planet carrier; the first planetary gear comprises a pinion and a bull gear; the planetary idle gear and the pinion are both internally engaged with the first ring gear and both externally engaged with the sun idle gear; the pinion is radially floatable relative to the first planet carrier; the gearbox is further provided with an input shaft, and one end of the input shaft is connected to the first ring gear or the sun idle gear, wherein the first planetary gear train further comprises a first sun gear, wherein the gearbox further comprises one or more stages of second planetary gear train, the second planetary gear train comprises a second ring gear, a second planet carrier, a second planetary gear and a second sun gear, the second planetary gear is mounted to the second planet carrier, and the second planetary gear is internally engaged with the second ring gear and externally engaged with the second sun gear; and the second planet carrier is in transmission connection with the first sun gear or the second sun gear of a previous stage, wherein the second planet carrier comprises two mounting plates spaced apart along the axial direction, and a receiving space for receiving the second planetary gear is formed between the two mounting plates, wherein the second planetary gear is mounted on a second planetary gear shaft, a third bearing is provided between the second planetary gear and the second planetary gear shaft, and two ends of the second planetary gear shaft are respectively connected to the two mounting plates.

20. The gearbox according to claim 19, wherein the second planet carrier comprises a connection sleeve, one end of the connection sleeve is integrated or connected with one of the mounting plates, and the other end of the connection sleeve extends toward the first sun gear or the second sun gear of the previous stage, and the first sun gear or the second sun gear of the previous stage is connected to the connection sleeve.

* * * * *